United States Patent
Hayashi et al.

(10) Patent No.: US 8,406,821 B2
(45) Date of Patent: Mar. 26, 2013

(54) IN-VEHICLE HANDS-FREE PHONE SYSTEM, AND TONE SENDING-OUT METHOD

(75) Inventors: Kazushige Hayashi, Toyota (JP); Soichi Saito, Obu (JP); Suguru Matsushita, Obu (JP); Takahisa Ozaki, Gamagori (JP); Hirokazu Ishida, Anjo (JP)

(73) Assignees: Toyota Jidosha Kabushiki Kaisha, Toyota-shi (JP); Denso Corporation, Kariya-shi (JP)

( * ) Notice: Subject to any disclaimer, the term of this patent is extended or adjusted under 35 U.S.C. 154(b) by 329 days.

(21) Appl. No.: 12/822,565

(22) Filed: Jun. 24, 2010

(65) Prior Publication Data

US 2010/0331044 A1 Dec. 30, 2010

(30) Foreign Application Priority Data

Jun. 24, 2009 (JP) ................................. 2009-149500

(51) Int. Cl.
*H04M 1/00* (2006.01)
(52) U.S. Cl. ............... 455/569.2; 455/569.1; 455/550.1; 455/557; 455/564
(58) Field of Classification Search ............... 455/569.2, 455/569.1, 550.1, 556.1, 557, 564
See application file for complete search history.

(56) References Cited

U.S. PATENT DOCUMENTS

| | | | |
|---|---|---|---|
| 2006/0046769 A1* | 3/2006 | Arun | 455/550.1 |
| 2009/0270067 A1* | 10/2009 | Johnson | 455/405 |
| 2010/0137037 A1* | 6/2010 | Basir | 455/569.1 |

FOREIGN PATENT DOCUMENTS

| | | |
|---|---|---|
| JP | 2007258825 A | 10/2007 |
| JP | 2008098981 A | 4/2008 |

* cited by examiner

*Primary Examiner* — Kwasi Karikari
(74) *Attorney, Agent, or Firm* — Gifford, Krass, Sprinkle, Anderson & Citkowski, P.C.

(57) ABSTRACT

An in-vehicle hands-free phone system includes: a base station; a portable terminal that is wirelessly connected to the base station; and an in-vehicle device that includes: an information acquisition portion that acquires information about a portable terminal that is connected to the in-vehicle device; a storage portion that stores a number sequence whose intermediate portion includes a predetermined code; and a tone sending-out control portion that sends the number sequence stored in the storage portion to the portable terminal and causes the portable terminal to send out the number sequence in a tone. The tone sending-out control portion determines a tone sending-out behavior about a number sequence part that is subsequent to the predetermined code on the basis of the information acquired by the information acquisition portion.

10 Claims, 7 Drawing Sheets

IN-VEHICLE HANDS-FREE PHONE SYSTEM, AND TONE SENDING-OUT METHOD

INCORPORATION BY REFERENCE

The disclosure of Japanese Patent Application No. 2009-149500 filed on Jun. 24, 2009 including the specification, drawings and abstract is incorporated herein by reference in its entirety.

BACKGROUND OF THE INVENTION

1. Field of the Invention

The invention relates to an in-vehicle hands-free phone system and to a tone sending-out method.

2. Description of the Related Art

An in-vehicle hands-free phone system that is realized by cooperation between an in-vehicle device and a cellular phone that a user brings into the vehicle is described in, for example, Japanese Patent Application Publication No. 2008-098981 (JP-A-2008-098981). In such an in-vehicle hands-free phone system, a user can make a call from inside the vehicle by operating an operation key portion of the in-vehicle device to connect to a phone of a communication partner or party and talk with the party via the user's cellular phone.

In some cases, after a user connects to a desired party by inputting, for example, the party's phone number, via the user's cellular phone, the user does a desired transaction by inputting a credit card number, a secret number, etc. that is requested by the party at the other end of the connection. Such a number (number sequence) is cumbersome to input for every transaction. Therefore, as for a party that requests the input of a fixed number sequence, it is a common practice to store in a telephone book of the cellular phone a number sequence that is made up of, for example, the party's phone number, the user's credit card number and the user's secrete number. This is convenient since a desired number sequence can be retrieved from the phone book, and can be sent out in the form of tones to the cellular phone. In this case, the user usually inserts a predetermined symbol or code, such as P, T, W, etc. in a number sequence to be stored in the telephone book, for example, between a phone number and a credit card number in the number sequence so that the credit card number is not sent out in the form of tones immediately after the tone sending-out of the phone number. Generally, a plurality of predetermined codes are prepared beforehand by cellular phone service providers. For example, in a certain cellular phone service provider, the meaning of "P" is, for example, to wait for an operation performed by the user and then send out a number sequence part up to the next predetermined code (if there is no next predetermined code, the number sequence part up to the end is sent out. This also applies to the description below.) in the form of tones, and the meaning of "T" is, for example, to wait for 2 seconds and then send out a number sequence part up to the next code in the form of tones. Therefore, the user needs to understand the meanings of these codes according to the cellular phone service provider of a cellular phone that the user owns, in order to store number sequences that include predetermined codes into a telephone book of the cellular phone.

However, specific codes, such as P and the like, although used by a plurality of cellular phone service providers, are handled differently among the cellular phone service providers. Besides, specific codes, such as "T" and the like, are handled differently among cellular phone service providers in such a manner that a specific code, such as "T" or the like, can be used only with a specific cellular phone operator. Therefore, in an in-vehicle hands-free phone system, there is a possibility that the tone sending-out that a user intends may not be realized if the in-vehicle device causes a cellular phone to carry out the tone sending-out without grasping the cellular phone service provider of the cellular phone.

SUMMARY OF THE INVENTION

The invention provides an in-vehicle hands-free phone system and a tone sending-out method that reduce the failures in the tone sending-out of number sequences that include predetermined codes that differ in the handling manners thereof among cellular phone service providers.

A first aspect of the invention relates to an in-vehicle hands-free phone system. This in-vehicle hands-free phone system includes: a base station; a portable terminal that is wirelessly connected to the base station; and an in-vehicle device that includes: an information acquisition portion that acquires information about the portable terminal that is connected to the in-vehicle device; a storage portion that stores a number sequence whose intermediate portion includes a predetermined code; and a tone sending-out control portion that sends the number sequence stored in the storage portion to the portable terminal and causes the portable terminal to send out the number sequence in a tone, wherein the tone sending-out control portion determines a tone sending-out behavior about a number sequence part that is subsequent to the predetermined code based on the information acquired by the information acquisition portion.

A second aspect of the invention relates to a tone sending-out method in an in-vehicle hands-free phone system that includes a base station, a portable terminal that is wireles sly connected to the base station, and an in-vehicle device that has a storage portion. This tone sending-out method in the in-vehicle hands-free phone system includes: acquiring information about the portable terminal that is connected to the in-vehicle device; reading from the storage portion a number sequence whose intermediate portion includes a predetermined code; determining a tone sending-out behavior about a number sequence part that is subsequent to the predetermined code that is included in the number sequence read from the storage portion, based on the information acquired about the portable terminal; and sending the read number sequence to the portable terminal and causing the portable terminal to send out the number sequence in a tone based on the tone sending-out behavior determined.

According to the invention, an in-vehicle hands-free phone system and the like capable of reducing the failures in the tone sending-out of number sequences that include pre-determined codes that differ in the handling manners thereof among the cellular phone service providers can be obtained.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Hereinafter, first to third embodiments of the invention will be described with reference to the drawings.

Figure 1:
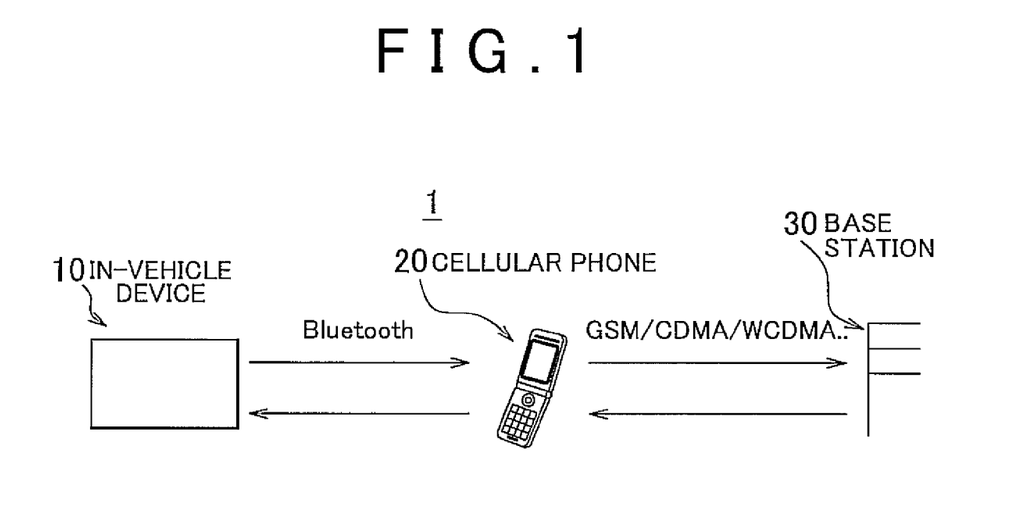
FIG. 1 is an overall system diagram showing an in-vehicle hands-free phone system according to a first embodiment of the invention.

FIG. 1 is an overall system diagram showing an in-vehicle hands-free phone system 1 according to a first embodiment of the invention.

The in-vehicle hands-free phone system 1 in this embodiment includes an in-vehicle device 10 and a cellular phone 20.

Bidirectional communication is possible between the in-vehicle device 10 and the cellular phone 20. This communication may be realized on the basis of, for example, the Bluetooth (registered trademark). Alternatively, this communication may be realized in another form of wireless communication. Alternatively, this communication may be realized by wire-connection between the in-vehicle device 10 and the cellular phone 20. The cellular phone 20 may be not only the so-called cellular phone, but may also be any portable terminal, such as a PDA (personal digital assistant) or the like, as long as the device has functions that are described below.

The cellular phone 20 has therein a memory in which a phone book that the user has registered is stored. The cellular phone 20 is wirelessly connectable to other cellular phones or fixed-line phones (not shown) via a base station 30. Incidentally, the method for the communication between the cellular phone 20 and the base station is arbitrary depending on the cellular phone service provider (carrier) of the cellular phone 20, and may be, for example, GSM (Global System for Mobile Communications), CDMA (Code Division Multiple Access), WCDMA (Wideband Code Division Multiple Access), etc.

The cellular phone 20, when connected to the in-vehicle device 10, allows a generally termed hands-free call by bidirectional communication between the cellular phone 20 and the in-vehicle device 10. For example, when the user presses a call button after inputting a phone number of a party from the in-vehicle device 10, a call is originated via the cellular phone 20, so that a connection is established with the party's cellular phone or fixed-line phone. At this time, the user is able to have a generally-termed hands-free phone conversation in which the user listens to the communication partner's voices that are output from an in-vehicle speaker provided in the vehicle and talks toward an in-vehicle microphone provided in the vehicle.

Figure 2:
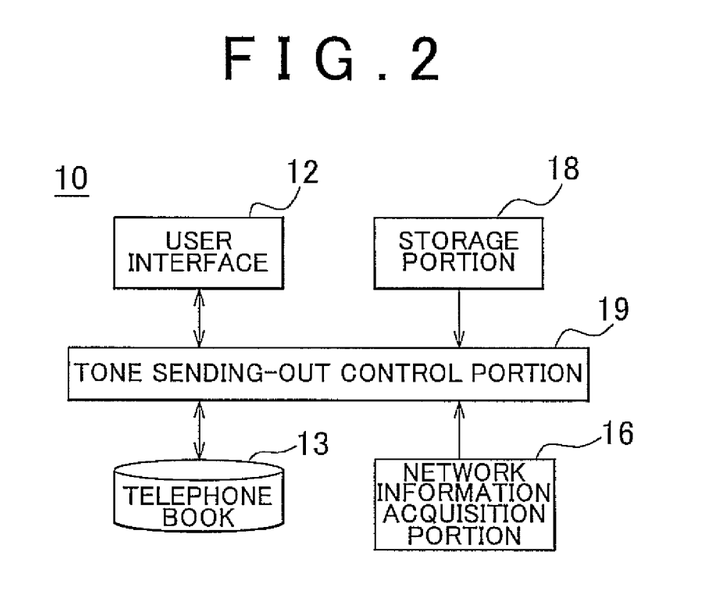
FIG. 2 is a diagram showing a main construction of an in-vehicle device in accordance with the first embodiment.

FIG. 2 is a diagram showing a main construction of the in-vehicle device 10. The in-vehicle device 10 has a hardware construction that is formed by a microcomputer that is made up of a CPU, a ROM, a RAM, etc., that are interconnected via a bus (not shown).

The in-vehicle device 10 includes a user interface 12 for dialogues with a user. The user interface 12 may, for example, the touch panel of a touch panel display device, a group of switches that are arranged in a remote controller, an instrument panel or a steering device, etc.

As shown in FIG. 2, the in-vehicle device 10 includes a telephone book 13. The telephone book 13 is constructed of a storage device, for example, a hard disk drive or the like. Into the telephone book 13, the telephone book data stored in a similar telephone book that is provided in the cellular phone 20 is stored (copied). For example, when the in-vehicle device 10 is connected with the cellular phone 20, the in-vehicle device 10 acquires the telephone book data of the telephone book of the cellular phone 20 (phone numbers, and number sequences (described below) to be sent out in tones), and stores the acquired telephone book data into the telephone book 13. Therefore, the telephone book 13 typically stores the telephone numbers of the acquaintances of the user of the cellular phone 20, the facilities that the same user uses, etc. Incidentally, the telephone book 13 may also be able to store telephone book data separately for each of a plurality of cellular phones 20, assuming that a plurality of users (cellular phones 20) use the same vehicle. Besides, telephone book data in the telephone book 13 may include a telephone book data that the user inputs via the user interface 12, or may also be generated, or added to the existing telephone book data, by downloading telephone book data from a storage medium that the user brings into the vehicle, or may also be generated or added to the existing data by downloading telephone book data from an external server.

In this embodiment, the telephone book 13 stores number sequences to be sent out in tones which include predetermined codes (described below). A number sequence to be sent out in tones that includes predetermined codes typically includes the phone number of a communication partner or party at the head of the number sequence, and subsequently includes a predetermined number sequence. The predetermined number sequence is a number sequence of, for example, the number of a credit card of the user, the date of expiration of the credit card, the user's date of birth, a password, a user ID, etc. Once a number sequence to be sent out in tones that needs to be frequently input is registered (stored) beforehand, it is no longer necessary to input the number sequence to be sent out in tones every occasion. The number sequence to be sent out in tones is divided by predetermined codes (described below). For example, the predetermined code is inserted between the phone number of a party and a predetermined number sequence that is subsequent to the phone number, that is, comes after the phone number, is a predetermined code (described later) that determines a behavior (timing or the like) at the time of sending out in tones the predetermined number sequence subsequent to the phone number. Besides, in the case where the predetermined number sequence that is subsequent to the telephone number of a party includes two or more kinds of number sequence parts (e.g., two kinds of number sequence parts that are the number of a credit card and the expiration date of the credit card), and where such number sequence parts must not be continuously sent out in tones, a predetermined code (described later) is inserted between the number sequence parts.

The in-vehicle device 10 includes a network information acquisition portion 16. The network information acquisition portion 16, while the in-vehicle device 10 is connected to the cellular phone 20, outputs to the cellular phone 20 a command to acquire information about the network to which the cellular phone 20 is currently connected. In response to this command, the cellular phone 20 acquires information about the network to which the cellular phone 20 is connected, from the base station 30. Then, the network information acquisition portion 16 acquires from the cellular phone 20 the network information that the cellular phone 20 has acquired. In this manner, the network information acquisition portion 16 acquires information about the network to which the cellular phone 20 is currently connected, from the base station 30 via the cellular phone 20. The network information includes information that specifies the cellular phone service provider that provides and manages the network to which the cellular phone 20 is currently connected. The cellular phone service provider that provides the network to which the cellular phone 20 is currently connected is usually the cellular phone service provider of the cellular phone 20. However, in the case of roaming, the cellular phone service provider that provides the network to which the cellular phone 20 is currently connected is a cellular phone service provider other than the cellular phone service provider of the cellular phone 20 (i.e., another cellular phone service provider that is allied with the cellular phone service provider of the cellular phone 20).

Besides, the network information acquisition portion 16 may also acquire roaming information as well as the network information, via the cellular phone 20. The roaming information represents whether or not the network to which the cellular phone 20 is currently connected is the network of another cellular phone service provider. For example, in the case where the cellular phone 20 is connected to the network of the cellular phone service provider of the cellular phone 20, the roaming information indicates a "Home" state (a non-roaming state). On the other hand, in the case where the cellular phone 20 is connected to the network of a cellular phone service provider that is other than the cellular phone service provider of the cellular phone 20, the roaming information indicates a "Roam" state (a roaming state).

The in-vehicle device 10 includes a storage portion 18. The storage portion 18 stores a table that defines manners of handling predetermined codes (manners of handling predetermined codes at the time of sending out tones) according to the network information and the roaming information (hereinafter, referred to as "code reference table"). The code reference table is prepared and stored beforehand. However, it is to be noted that the code reference table may be regularly or irregularly updated, for example, on the basis of the latest information that is downloaded from an external server, so as to correspond with a future (later) alteration of the manners of handling the predetermined codes.

The predetermined codes herein are codes, such as P, T, W, etc. that are used in the United States, and are codes that prescribe a tone sending-out behavior. However, as pointed out above in conjunction with the description of the related art, the manners of handling the codes P, T and W, that is, the tone sending-out behaviors about the codes P, T and W, differ among cellular phone service providers. In an example shown in Table 1, in "S" company as a cellular phone service provider, the code P is handled as a code for waiting for a user's operation, whereas the code P is handled as a code for waiting for 2 seconds in one other cellular phone service provider that is other than the cellular phone service provider S company (hereinafter, also referred to as "other cellular phone service provider", which can be a plurality of cellular phone service providers). On another hand, the cellular phone service provider S company handles the code T as a code for waiting for 2 seconds whereas the other cellular phone service provider handles the code W as a code for waiting for a user's operation.

TABLE 1

| Service provider | Code | Handling manner |
|---|---|---|
| S company | P | Wait for user's operation |
|  | T | Wait for 2 seconds |
| Other(s) | P | Wait for 2 seconds |
|  | W | Wait for user's operation |

Table 2 shows an example of the code reference table that is stored in the storage portion 18.

TABLE 2

| | Network information | | | |
|---|---|---|---|---|
| | S company | | Other(s) | |
| Roaming information | Home | Roam | Home | Roam |
| P | Wait for user's operation | Wait for 2 seconds | Wait for 2 seconds | * |
| T | Wait for 2 seconds | (Wait for 2 seconds) | (Wait for 2 seconds) | (Wait for 2 seconds) |
| W | (Wait for user's operation) | Wait for user's operation | Wait for user's operation | (Wait for user's operation) |

Table 2 is to be understood as follows. For example, in the case where the network information represents S company and the roaming information represents the Home (non-roaming) state, the code P is handled as a code for waiting for a user's operation, and the code T is handled as a code for waiting for 2 seconds, and the code W is handled as a code for waiting for a user's operation. Incidentally, in Table 2, the implementation of the parenthesized code-handling manners is arbitrary. That is, the parentheses mean that, for example, in the case where the network information represents S company and the roaming information represents the Home (non-roaming) state, it is recommended to handle the code W as a code for waiting for a user's operation, but the code W may instead be handled in another manner.

The cell marked with * in Table 2 may be handled in a manner described below since the possibility of using the cellular phone 20 of S company cannot be denied. In the case where a number sequence that includes the code W exists in the telephone book 13, the cellular phone service provider is estimated as being an "other company", and the code P is handled as a code for waiting for 2 seconds. Besides, in the case where a number sequence that includes the code T exists in the telephone book 13, the cellular phone service provider is estimated as being "S company", and the code P is handled as a code for waiting for a user's operation. Besides, in the case where both a number sequence that includes the code P and a number sequence that includes the code W exist in the telephone book 13, or in the case where a number sequence that includes both the code P and the code W exists in the telephone book 13, or in the case where neither the code P nor the code W is included in the telephone book 13, the cellular phone service provider is estimated as being an "other company", and the code P is handled as a code for waiting for 2 seconds.

The in-vehicle device 10 includes a tone sending-out control portion 19. The tone sending-out control portion 19 performs a tone sending-out control at the time of sending out tones via the cellular phone 20 while the in-vehicle device 10 is connected to the cellular phone 20.

Figure 3:
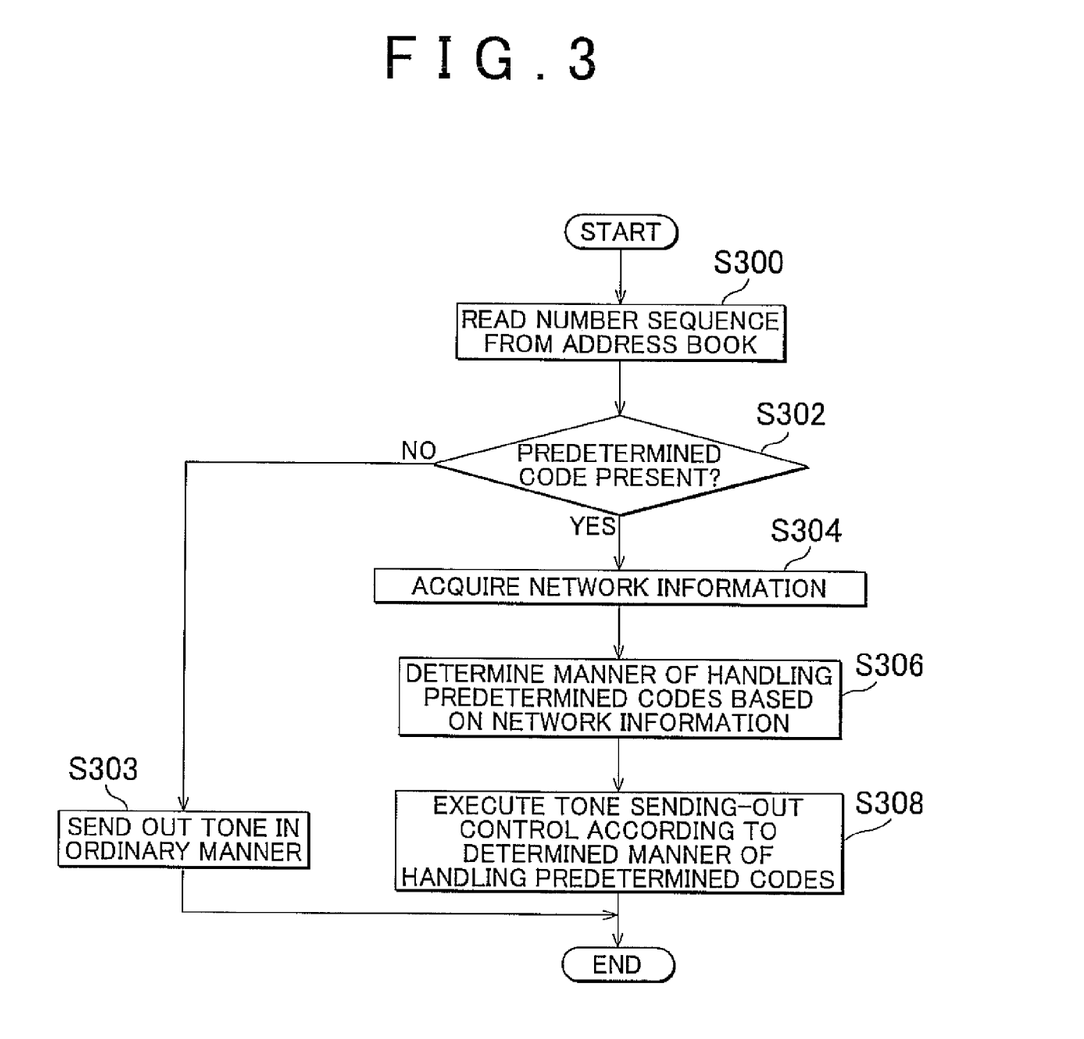
FIG. 3 is a flowchart showing an example of a tone sending-out control that is executed by a tone sending-out control portion shown in FIG. 2.

FIG. 3 is a flowchart showing an example of the tone sending-out control that is executed by the tone sending-out control portion 19 in the first embodiment. The process routine shown in FIG. 3 is executed while the cellular phone 20 is connected to the in-vehicle device 10. The process routine is started, for example, when a user inputs a tone sending-out command via the user interface 12 of the in-vehicle device 10.

In step 300, the tone sending-out control portion 19 reads from the telephone book 13 a number sequence that is to be sent out in the form of tones. The number sequence in the telephone book 13 which is to be sent out in the form of tones is specified by the user via the user interface 12.

In this embodiment, it is assumed that the cellular phone service provider of the cellular phone 20 is S company, and the number sequence to be sent out in the form of tones is 0120111P1234T5678. It is assumed that the number sequence part "0120111" is a telephone number. Besides, in the number sequence to be sent out in tones this time, it is assumed that the number sequence part "1234" is a user ID, and the number sequence part "5678" is a secret number. The number sequence to be sent out in tones is a number sequence that is prepared for such a party that every time the cellular phone 20 is connected to the party, the user ID is sent out in tones by following, for example, a voice message "Press keys for the user ID after the beep.", and the secret number is sent out in tones by following, for example, a voice message "Subsequently, press keys for the secret number.". The user has placed the code T between the user ID and the secret number since this party requests that the secret number be input within 2 seconds after the user ID is pressed in.

In step 302, the tone sending-out control portion 19 determines whether or not a predetermined code (at least one of P, T and W in this embodiment) is included in the number sequence that has been read from the telephone book 13. If the number sequence read from the telephone book 13 does not include a predetermined code, the process proceeds to step 303, in which the tone sending-out control portion 19 sends the number sequence read from the telephone book 13 directly (without performing the waiting for an operation of the user, or the like) to the cellular phone 20, and causes the cellular phone 20 to send out the number sequence in the form of tones. On the other hand, if the number sequence read from the telephone book 13 does not include a predetermined code, the process proceeds to step 304.

In step 304, the tone sending-out control portion 19 commands the network information acquisition portion 16 to acquire network information from the base station 30 via the cellular phone 20, and then acquires the network information from the network information acquisition portion 16. Incidentally, in the case where the network information acquisition portion 16 has already acquired network information, the already acquired network information may be utilized.

In step 306, using the network information acquired in step 304 and the code reference table stored in the storage portion 18, the tone sending-out control portion 19 determines the manner of handling the predetermined code (or codes) included in the number sequence, that is, the tone sending-out behavior about the number sequence part (or parts) that is subsequent to the predetermined code (or codes). In this embodiment, the network information is assumed to be S company. In this embodiment, since the roaming information has not been acquired, it is not known whether or not the cellular phone 20 is in the roaming state; however, considering that generally the non-roaming state is a usual state of the cellular phone 20, it is assumed that the cellular phone 20 is in the non-roaming state. In this case, the code P is handled as a code for waiting for a user's operation, and the code T is handled as a code for waiting for 2 seconds, and the code W is handled as a code for waiting for a user's operation.

In step 308, the tone sending-out control portion 19 executes a tone sending-out control in accordance with the manner of handling the predetermined code which is determined in step 306.

Concretely, since the number sequence to be sent out in tones this time is "0120111P1234T5678", the tone sending-out control portion 19 firstly sends the number sequence part "0120111" preceding the predetermined code P to the cellular phone 20, and causes the cellular phone 20 to send out the number sequence part in tones. After that, the tone sending-out control portion 19 requests an operation performed by the user, via the user interface 12, corresponding to the handling of the predetermined code P. For example, if the user interface 12 is a touch panel display, a touch switch that can be operated by the user is displayed in touch panel display. The touch switch may be provided with a display that makes the user understand that, for example, if the user operates the switch, the next number sequence part will be sent out in tones. In this case, for example, the user first receives a voice message "After hearing a beep, please press in your user ID." from the party at the other end of the connection, and then operates the touch switch after hearing the beep. In response to the operation of the user, the tone sending-out control portion 19 sends the number sequence part "1234" preceding the next predetermined code T to the cellular phone 20, and causes the cellular phone 20 to send out the number sequence part in tones. In this manner, the number sequence part "1234" corresponding to the user ID is appropriately sent out in tones. Next, the tone sending-out control portion 19, corresponding to the handling of the predetermined code T, waits for 2 seconds after sending the number sequence part "1234", and, after the elapse of 2 seconds, sends the number sequence part "5678" subsequent to the predetermined code T to the cellular phone 20, and causes the cellular phone 20 to send out the number sequence part "5678" in tones. In this manner, the number sequence part "5678" corresponding to the secret number is appropriately sent out in tones.

Thus, according to the process shown in FIG. 3, the in-vehicle device 10 determines the manners of handling the predetermined codes on the basis of the network information, and sends information to the cellular phone 20 in accordance with the determined handling manners. Therefore, even in the case where the cellular phone service provider of the cellular phone 20 cannot be directly grasped, the in-vehicle device 10 is able to accurately estimate the cellular phone service provider of the cellular phone 20 and accomplish the corresponding tone sending-out via the cellular phone 20.

Figure 4:
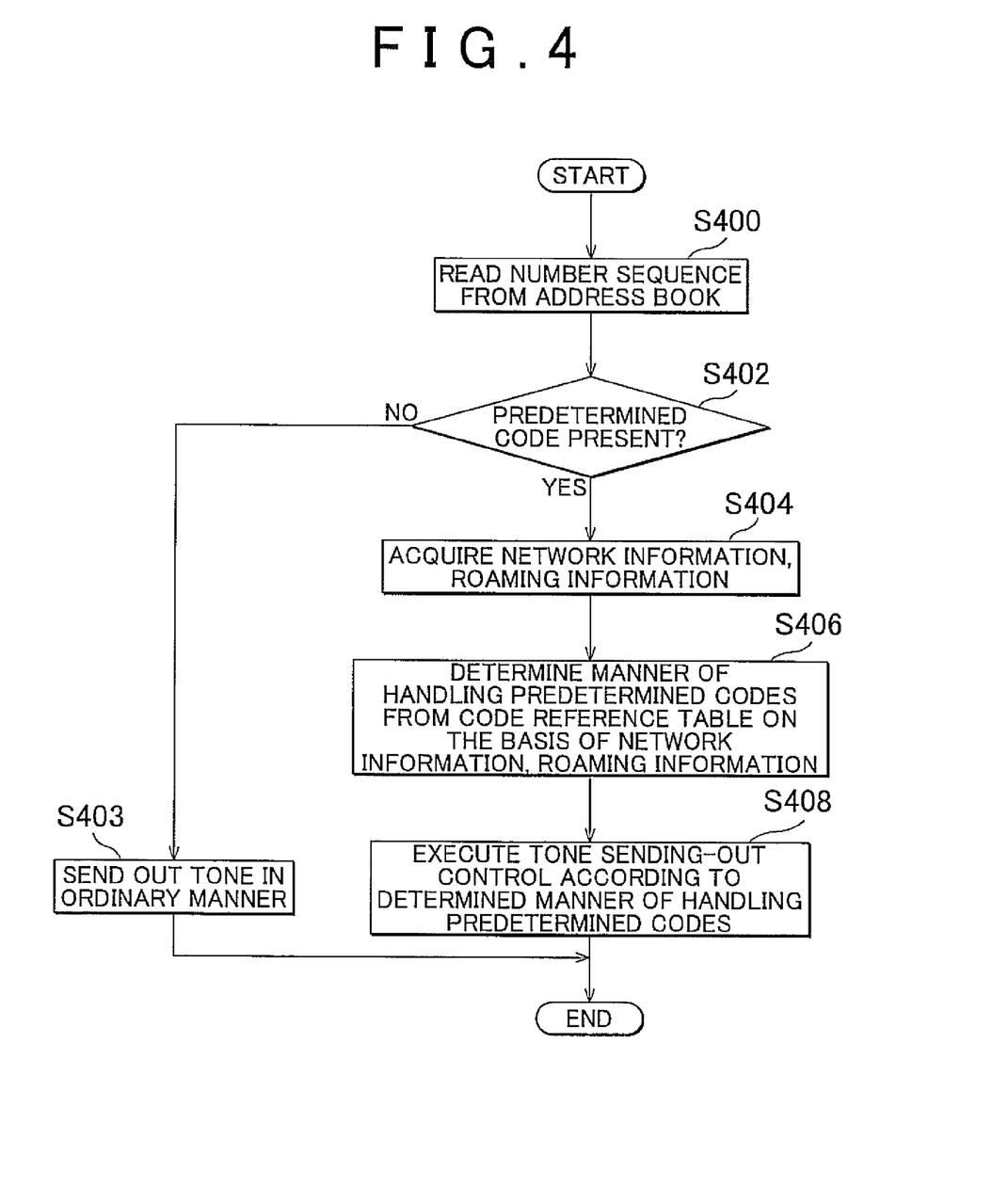
FIG. 4 is a flowchart showing another example of the tone sending-out control that is executed by the tone sending-out control portion shown in FIG. 2.

FIG. 4 is a flowchart showing a modification of the tone sending-out control that is executed by the tone sending-out control portion 19 in the first embodiment. The process routine shown in FIG. 4 is executed while the cellular phone 20 is connected to the in-vehicle device 10. The routine is started, for example, when a user inputs a tone sending-out command via the user interface 12 of the in-vehicle device 10.

The processes of steps 400, 402, 403 in the process routine shown in FIG. 4 are substantially the same as the processes of steps 300, 302 and 303 in the foregoing process routine shown in FIG. 3, and descriptions thereof are omitted below. Incidentally, it is assumed that the cellular phone service provider of the cellular phone 20 is S company and the number sequence to be sent out in tones at this time is 0120111P1234T5678.

In step 404, the tone sending-out control portion 19 commands the network information acquisition portion 16 to acquire network information and roaming information from the base station 30 via the cellular phone 20, and then acquires the network information and the roaming information from the network information acquisition portion 16. Incidentally, in the case where the network information acquisition portion 16 has already acquired network information and/or roaming information, it is appropriate to utilize the already acquired network information and/or the already acquired roaming information.

In step 406, using the network information and the roaming information acquired in step 404 and the code reference table stored in the storage portion 18, the tone sending-out control portion 19 determines the manner of handling a predetermined code (or codes) included in the number sequence, that is, the tone sending-out behavior about the number sequence part (or parts) subsequent to the predetermined code (or codes). In this embodiment, it is assumed that the network information represents S company, and that the roaming information represents the Home (non-roaming) state. In this case, in accordance with the code reference table, the code P is handled as a code for waiting for a user's operation, and the code T is handled as a code for waiting for 2 seconds, and the code W is handled as a code for waiting for a user's operation.

In step 408, the tone sending-out control portion 19 executes the tone sending-out control in accordance with the manner of handling the predetermined code which is determined in step 406.

Concretely, since the number sequence to be sent out in tones is 0120111P1234T5678, the tone sending-out control portion 19 firstly sends the number sequence part "0120111" preceding the predetermined code P to the cellular phone 20, and causes the cellular phone 20 to send out the number sequence part in tones. After that, the tone sending-out control portion 19, corresponding to the handling of the predetermined code P, requests an operation performed by the user via the user interface 12. For example, if the user interface 12 is a touch panel display, a touch switch that can be operated by the user is displayed in the touch panel display. In this case, for example, the user first receives a voice message "After hearing a beep, please press in your user ID." from the party at the other end of the connection via an in-vehicle speaker, and then operates the touch switch after hearing the beep via the in-vehicle speaker. In response to the operation of the user, the tone sending-out control portion 19 sends the number sequence part "1234" preceding the predetermined next code T to the cellular phone 20, and causes the cellular phone 20 to send out the number sequence part in tones. In this manner, the number sequence part "1234" corresponding to the user ID is appropriately sent out in tones. Next, the tone sending-out control portion 19, corresponding to the handling of the predetermined code T, waits for 2 seconds after sending the number sequence part "1234", and, after the elapse of 2 seconds, sends the number sequence part "5678" subsequent to the predetermined code T to the cellular phone 20, and causes the cellular phone 20 to send out the number sequence part in tones. In this manner, the number sequence part "5678" corresponding to the secret number is appropriately sent out in tones.

Incidentally, in the case where the cellular phone service provider of the cellular phone 20 is other than S company, the user prepares and registers a number sequence of 0120111W1234P5678 in order to send out the same tones to the same party as in the foregoing example. In this case, if the network information represents S company and the roaming information represents the Roam (roaming) state, the tone sending-out control portion 19 handles the code W as a code for waiting for a user's operation, and handles the code T as a code for waiting for 2 seconds, and handles the code P as a code for waiting for 2 seconds (see step 406). Thus, the tone sending-out control portion 19 is able to cause the cellular phone 20 to appropriately send out 0120111W1234P5678 in tones substantially in the same manner as in the foregoing example (in which the sequence 0120111P1234T5678 is sent out in tones).

Thus, the process shown in FIG. 4 is able to achieve substantially the same effect as the foregoing process shown in FIG. 3. Furthermore, according to the process shown in FIG. 4, since the manner of handling the predetermined codes is determined by using roaming information in addition to network information, it is possible to more accurately estimate the cellular phone service provider of the cellular phone 20 than in a construction in which only network information is used. Due to this, the user of the in-vehicle device 10 can perform the tone sending-out via the in-vehicle device 10 with substantially the same operation feeling as when performing the tone sending-out from the cellular phone 20.

Incidentally, the foregoing first embodiment and the foregoing modification of the first embodiment (the processes shown in FIG. 3 and FIG. 4) may also be used in the case where the in-vehicle device 10 cannot directly grasp the cellular phone service provider of the cellular phone 20.

Next, a second embodiment will be described with reference to FIG. 5 and subsequent drawings. With regard to the second embodiment, the component elements that is the same as those in the first embodiment are presented with the same reference characters, and the descriptions thereof are omitted thereof.

Figure 5:
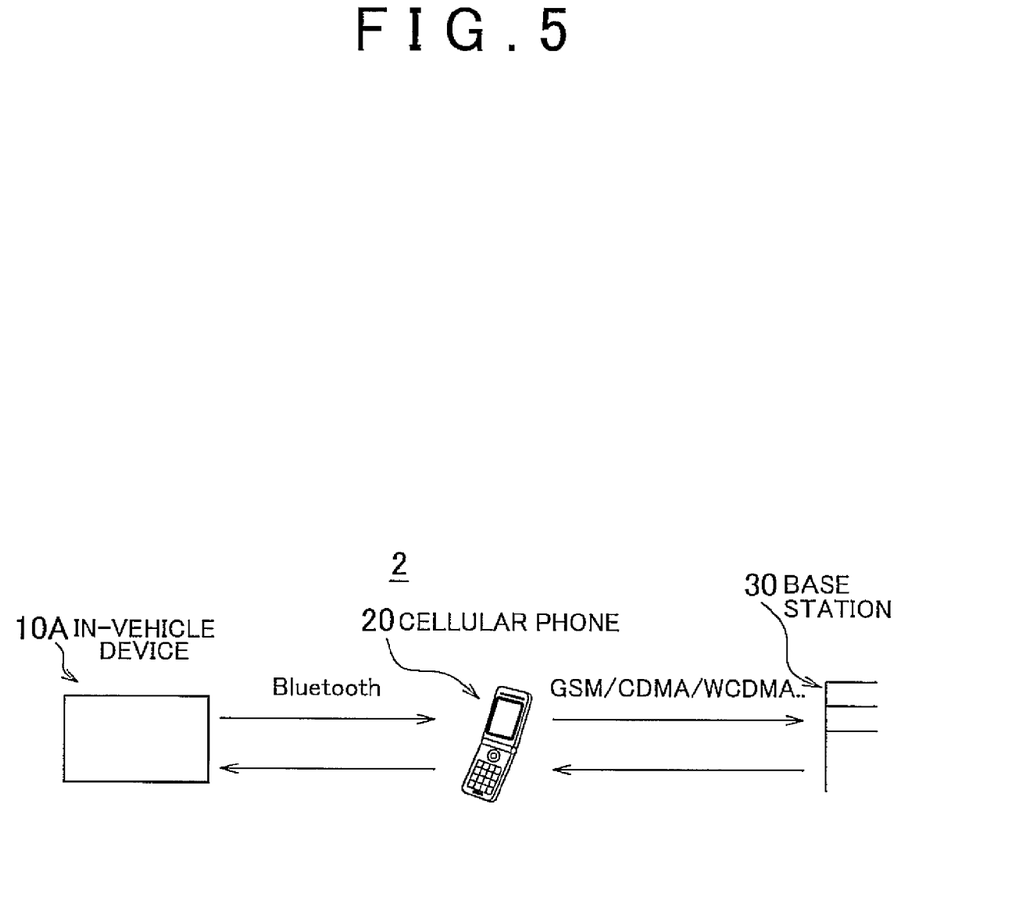
FIG. 5 is an overall system diagram showing an in-vehicle hands-free phone system according to a second embodiment of the invention.

FIG. 5 is an overall system diagram showing an in-vehicle hands-free phone system 2 according to the second embodiment of the invention. An in-vehicle hands-free phone system 2 in this embodiment includes an in-vehicle device 10A and a cellular phone 20.

Figure 6:
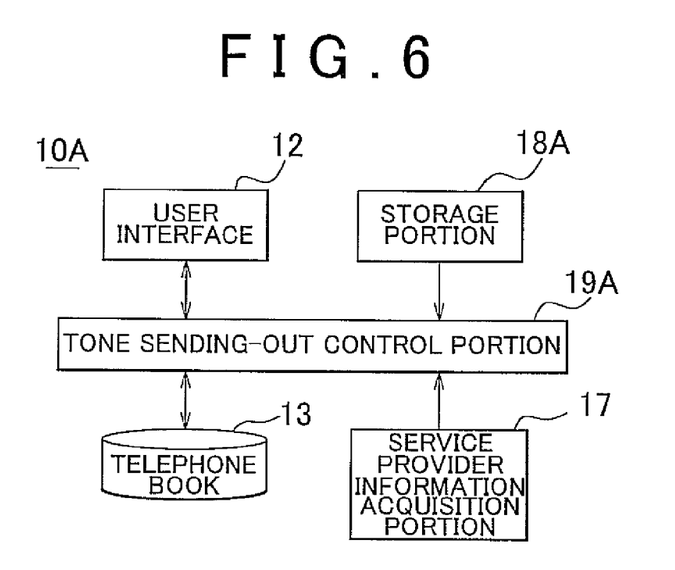
FIG. 6 is a diagram showing a main construction of an in-vehicle device according to the second embodiment.

FIG. 6 is a diagram showing a main construction of the in-vehicle device 10A. The in-vehicle device 10A includes a user interface 12, a telephone book 13, a service provider information acquisition portion 17, a storage portion 18A and a tone sending-out control portion 19A.

The service provider information acquisition portion 17 acquires information that represents the cellular phone service provider of a cellular phone 20 that is currently connected to the in-vehicle device 10A (hereinafter, referred to as "service provider information"). The service provider information may be information based on various kinds of cellular phone information that the user of the cellular phone 20 inputs via the user interface 12 at the time of registering the cellular phone 20 at the in-vehicle device 10A (the time of initial registration). In this case, the service provider information based on the cellular phone information input by the user is stored in, for example, the storage portion 18A. The service provider information acquisition portion 17 acquires, from the storage portion 18A, the service provider information that corresponds to the cellular phone 20 that is currently connected to the in-vehicle device 10A. Incidentally, in the case where a plurality of cellular phones 20 have been registered, the service provider information of each cellular phone 20 may be associated with correspondence with the ID of the cellular phone 20 (e.g., the intra-office phone number thereof) when stored in the storage portion 18A. In this case, the service provider information acquisition portion 17 acquires the ID of the cellular phone 20 that is currently connected to the in-vehicle device 10A, and acquires the service provider information commensurate with the ID from the storage portion 18A. In this case, the cellular phone 20 has a function of, for example, sending the its own ID to the in-vehicle device 10A in response to a request from the in-vehicle device 10A.

Alternatively, the service provider information acquisition portion 17 may also acquire service provider information directly from the cellular phone 20 that is currently connected to the in-vehicle device 10A (i.e., information that represents the cellular phone service provider of the cellular phone 20). In this case, the cellular phone 20 has a function of, for example, sending service provider information to the in-vehicle device 10A in response to a request from the in-vehicle device 10A.

The storage portion 18 stores a table that defines manners of handling predetermined codes (manners of handling predetermined codes at the time of sending out tones) according to the service provider information (code reference table). The code reference table may be, for example, a table as shown in Table 3.

TABLE 3

| service provider | Code | Handling manner |
|---|---|---|
| S Company | P | waiting for a user's operation |
| | T | waiting for 2 seconds |
| Other(s) | P | waiting for 2 seconds |
| | W | waiting for a user's operation |

Figure 7:
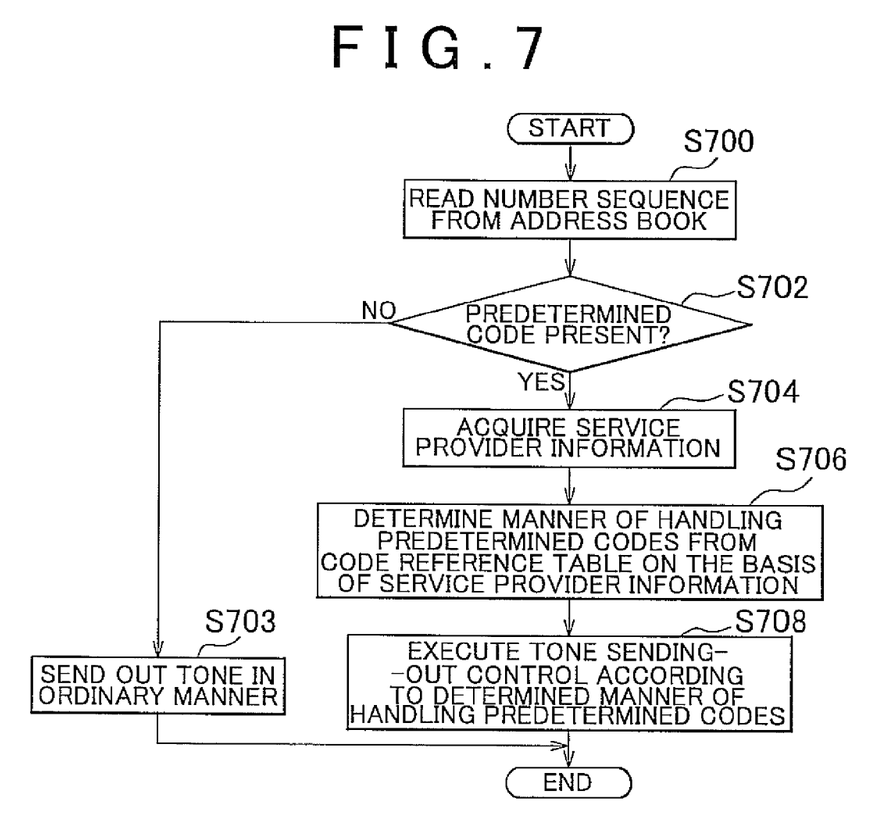
FIG. 7 is a flowchart showing an example of a tone sending-out control that is executed by a tone sending-out control portion in the second embodiment.

FIG. 7 is a flowchart showing an example of a tone sending-out control that is executed by the tone sending-out control portion 19A in the second embodiment. The process routine shown in FIG. 7 is executed while the cellular phone 20 is connected to the in-vehicle device 10A. The process routine is started, for example, when a user inputs a tone sending-out command via the user interface 12 of the in-vehicle device 10A.

The processes of steps 700, 702, 703 in the process routine shown in FIG. 7 are substantially the same as the processes of steps 300, 302 and 303 in the foregoing process routine shown in FIG. 3, and descriptions thereof are omitted below. Incidentally, in the description of this embodiment, it is also assumed that the cellular phone service provider of the cellular phone 20 is S company, and the number sequence to be sent out in tones is 0120111P1234T5678.

In step 704, the tone sending-out control portion 19A commands the service provider information acquisition portion 17 to acquire service provider information about the cellular phone 20 that is currently connected to the in-vehicle device 10A, and then acquires the service provider information from the service provider information acquisition portion 17. Incidentally, in the case where the service provider information acquisition portion 17 has already acquired service provider information, the acquired service provider information may be read from the storage portion 18A.

In step 706, the tone sending-out control portion 19A, using the service provider information acquired in step 704 and the code reference table stored in the storage portion 18A, determines the manner of handling the predetermined code (or codes) included in the number sequence, that is the tone sending-out behavior of the number sequence part (or parts) that are subsequent to the predetermined code (or codes). In this embodiment, it is assumed that the service provider information is S company. In this case, the code P is handled as a code for waiting for a user's operation, and the code T is handled as a code for waiting for 2 seconds.

In step 708, the tone sending-out control portion 19A executes the tone sending-out control in accordance with the predetermined code-handling manner determined in step 706.

Concretely, since the number sequence to be sent out in tones is 0120111P1234T5678, the tone sending-out control portion 19A firstly sends the number sequence part "0120111" preceding the predetermined code P to the cellular phone 20, and causes the cellular phone 20 to send out the number sequence part in tones. After that, the tone sending-out control portion 19A, corresponding to the handling of the predetermined code P, requests an operation performed by the user via the user interface 12. For example, if the user interface 12 is a touch panel display, a touch switch that can be operated by the user is displayed in the touch panel display. In this case, for example, the user first receives a voice message "After hearing a beep, please press in your user ID." from the party at the other end of the connection, and then operates the touch switch after hearing the beep. In response to the operation of the user, the tone sending-out control portion 19A sends the number sequence part "1234" preceding the predetermined next code T to the cellular phone 20, and causes the cellular phone 20 to send out the number sequence part in tones. In this manner, the number sequence part "1234" corresponding to the user ID is appropriately sent out in tones. Next, the tone sending-out control portion 19A, corresponding to the handling of the predetermined code T, waits for 2 seconds after sending the number sequence part "1234", and, after the elapse of 2 seconds, sends the number sequence part "5678" subsequent to the predetermined code T to the cellular phone 20, and causes the cellular phone 20 to send out the number sequence part "5678" in tones. In this manner, the number sequence part "5678" corresponding to the secret number is appropriately sent out in tones.

According to the process shown in FIG. 7, since the in-vehicle device 10A determines the manner of handling the predetermined codes on the basis of service provider information, and causes the cellular phone 20 to send out tones according to the determined handling manner, the in-vehicle device 10A is able to accomplish, via the cellular phone 20, the tone sending-out operation commensurate with the cellular phone service provider of the cellular phone 20. Due to this, the user of the in-vehicle device 10A can perform the tone sending-out via the in-vehicle device 10A with the same operation feeling as when performing the tone sending-out from the cellular phone 20.

Next, a third embodiment will be described with reference to FIG. 8 and subsequent drawings. The third embodiment is an embodiment in which the first embodiment and the second embodiment are appropriately combined. With regard to the third embodiment, the component elements that may be the same as those of the first embodiment and the second embodiment are presented with the same reference characters, and descriptions thereof are omitted below.

Figure 8:
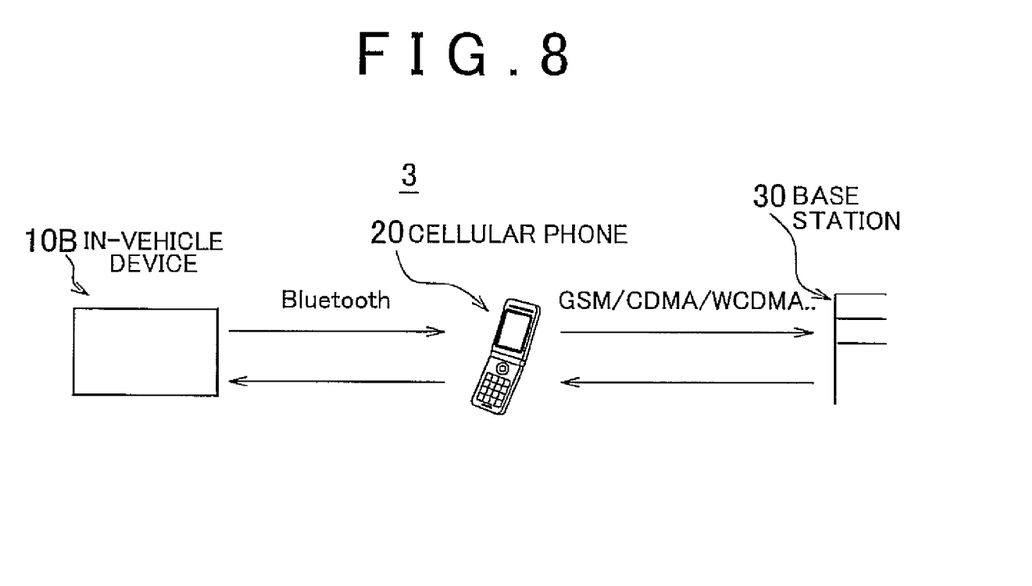
FIG. 8 is an overall system diagram showing an in-vehicle hands-free phone system according to a third embodiment of the invention.

FIG. 8 is an overall system diagram showing an in-vehicle hands-free phone system 3 according to the third embodiment of the invention. An in-vehicle hands-free phone system 3 of the embodiment includes an in-vehicle device 10B and a cellular phone 20.

Figure 9:
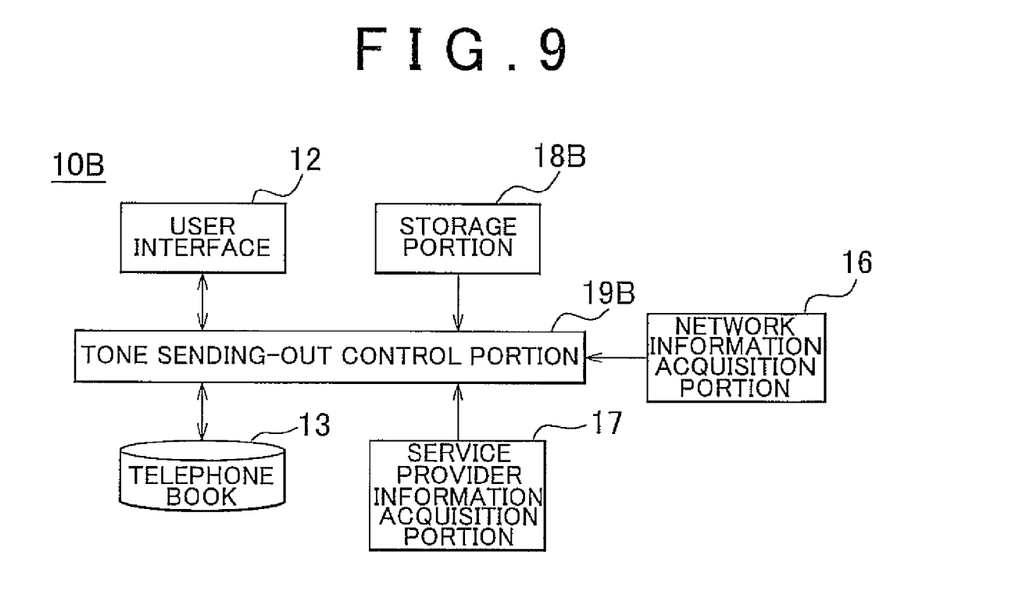
FIG. 9 is a diagram showing a main construction of an in-vehicle device according to the third embodiment.

FIG. 9 is a diagram showing a main construction of the in-vehicle device 10B according to the third embodiment. The in-vehicle device 10B includes a user interface 12, a telephone book 13, a network information acquisition portion 16, a service provider information acquisition portion 17, a storage portion 18B and a tone sending-out control portion 19B.

The storage portion 18B is formed by combining the foregoing storage portion 18 in the first embodiment and the foregoing storage portion 18A in the second embodiment. That is, the storage portion 18B stores a code reference table (see Table 2) that defines the manners of handling the predetermined codes according to network information and roaming information, and also stores a code reference table (see Table 3) that defines the manners of handling the predetermined codes commensurate with the service provider information.

Figure 10:
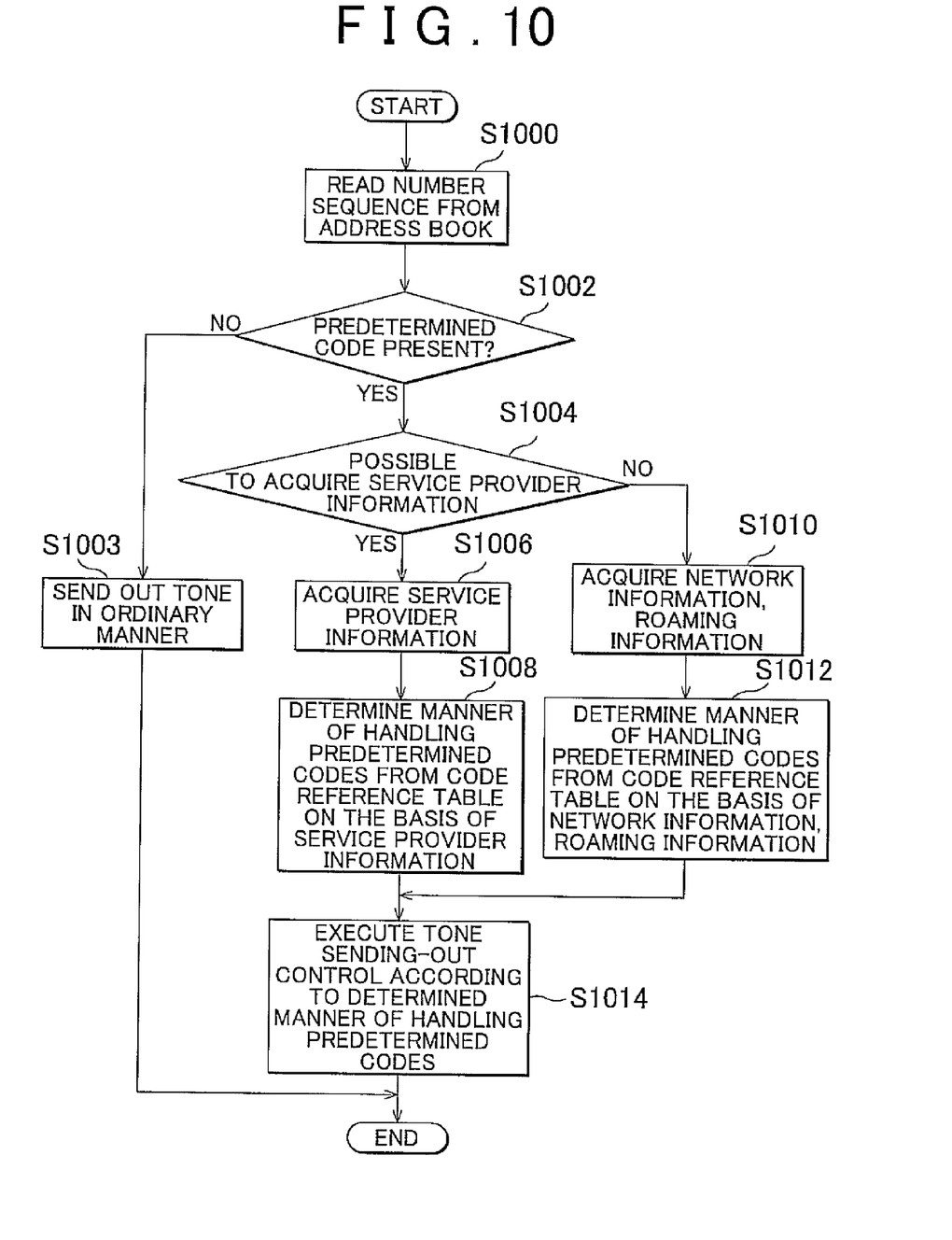
FIG. 10 is a flowchart showing an example of a tone sending-out control that is executed by a tone sending-out control portion in the third embodiment.

FIG. 10 is a flowchart showing an example of a tone sending-out control that is executed by the tone sending-out control portion 19B in the third embodiment. The process routine shown in FIG. 10 is executed while the cellular phone 20 is connected to the in-vehicle device 10B. The process routine is started, for example, when a user inputs a tone sending-out command via the user interface 12 of the in-vehicle device 10B.

The processes of steps 1000, 1002, 1003 in the process routine shown in FIG. 10 are substantially the same as the processes of steps 300, 302 and 303 in the foregoing process routine shown in FIG. 3, and descriptions thereof are omitted below.

In step 1004, the tone sending-out control portion 19B determines whether or not it is possible for the service provider information acquisition portion 17 to acquire service provider information. For example, the tone sending-out control portion 19B commands the service provider information acquisition portion 17 to determine whether or not it is possible to acquire the service provider information of the cellular phone 20 that is currently connected to the in-vehicle device 10B. Conceivable examples of the case where it is impossible to acquire service provider information includes a case where the storage portion 18B has not stored service provider information about the cellular phone 20 that is currently connected to the in-vehicle device 10B, a case where the cellular phone 20 that is presently connected to the in-vehicle device 10B does not have a function of sending service provider information. If it is possible to acquire service provider information via the service provider information acquisition portion 17, the process proceeds to step 1006. On the other hand, if it is not possible to acquire service provider information via the service provider information acquisition portion 17, the process proceeds to step 1010.

In step 1006, substantially the same process as in step 704 in FIG. 7 in the second embodiment is executed.

In step 1008, substantially the same process as in step 706 in FIG. 7 in the second embodiment is executed.

In step 1010, substantially the same process as in step 404 in FIG. 4 in the first embodiment is executed.

In step 1012, substantially the same process as in step 406 in FIG. 4 in the first embodiment is executed.

In step 1014, the tone sending-out control portion 19B executes the tone sending-out control in accordance with the manner of handling the predetermined codes determined in step 1008 or 1012. This process may be substantially the same as the process of step 708 in FIG. 7 in the second embodiment or the process of step 408 in FIG. 4 in the first embodiment.

Thus, according to the process shown in FIG. 10, since the in-vehicle device 10B determines the manner of handling the predetermined codes on the basis of service provider information, and causes the cellular phone 20 to send out tones according to the determined handling manner, the in-vehicle device 10B is able to accomplish, via the cellular phone 20, the tone sending-out operation commensurate with the cellular phone service provider of the cellular phone 20. Furthermore, even in the case where service provider information cannot be acquired, the in-vehicle device 10B determines the manner of handling the predetermined codes by using network information and roaming information, so that it is possible to accurately estimate the cellular phone service provider of the cellular phone 20. Due to this, the user of the in-vehicle device 10B can perform the tone sending-out via the in-vehicle device 10B in substantially the same manner as when performing the tone sending-out from the cellular phone 20.

While the invention has been described above with reference to embodiments thereof, the invention is not limited to the foregoing embodiments. On the contrary, the foregoing embodiments can be subjected to various modifications or substitutions without departing from the scope of the invention.

For example, although in the foregoing embodiments, the predetermined codes are P, W and T due to the assumption of the application in the United States, other codes can also be used in other countries, and the manners of handling of the codes can be different from the manners described above. Therefore, it is appropriate to create a code reference table according to the situations of a country where the invention is applied. Besides, in the case where roaming between countries (international roaming) needs to be considered, it is appropriate to consider codes that are used in those countries.

What is claimed is:

1. An in-vehicle hands-free phone system comprising:
a base station;
a portable terminal that is wirelessly connected to the base station; and
an in-vehicle device including:
an information acquisition portion that acquires one of network information about a network to which the portable terminal that is currently connected to the in-vehicle device, from the base station via the portable terminal, or service provider information about a service provider of the portable terminal that is currently connected to the in-vehicle device;
a storage portion that stores a number sequence whose intermediate portion includes a predetermined code; and
a tone sending-out control portion that sends the number sequence stored in the storage portion to the portable terminal and causes the portable terminal to send out the number sequence in a tone, wherein
the tone sending-out control portion determines a tone sending-out behavior about a number sequence part that is subsequent to the predetermined code based on one of the network information acquired by the information acquisition portion or the service provider information acquired by the information acquisition portion.

2. The in-vehicle hands-free phone system according to claim 1, wherein the portable terminal is a cellular phone or a PDA.

3. The in-vehicle hands-free phone system according to claim 1, wherein the portable terminal is connected to the in-vehicle device by wire or wirelessly.

4. The in-vehicle hands-free phone system according to claim 1, wherein the tone sending-out control portion determines one of a behavior of sending out the number sequence part subsequent to the predetermined code in a tone after waiting for an operation performed by a user and a behavior of sending out the number sequence part subsequent to the predetermined code in a tone after waiting for a predetermined time in second, based on the network information acquired by the information acquisition portion.

5. The in-vehicle hands-free phone system according to claim 1, wherein: the information acquisition portion acquires the network information and roaming information; and the tone sending-out control portion determines the tone sending-out behavior about the number sequence part subsequent to the predetermined code based on the network information and the roaming information acquired by the information acquisition portion.

6. The in-vehicle hands-free phone system according to claim 5, wherein the tone sending-out control portion determines one of a behavior of sending out the number sequence part subsequent to the predetermined code in a tone after waiting for an operation performed by a user and a behavior of sending out the number sequence part subsequent to the predetermined code in a tone after waiting for a predetermined time in second, based on the network information and the roaming information acquired by the information acquisition portion.

7. The in-vehicle hands-free phone system according to claim 1, wherein the number sequence whose intermediate portion includes a predetermined code includes a number sequence part for a telephone number of a communication partner, the predetermined code that is subsequent to the telephone number, and a number sequence part that subsequent to the predetermined code.

8. The in-vehicle hands-free phone system according to claim 1, wherein:

the network information acquired by the information acquisition portion includes roaming information about a network to which the portable terminal is currently connected; and the tone sending-out control portion determines a tone sending-out behavior about a number sequence part that is subsequent to the predetermined code, based on the service provider information acquired by the information acquisition portion if the service provider information is acquired by the information acquisition portion, and determines the tone sending-out behavior about the number sequence part that is subsequent to the predetermined code, based on the network information and the roaming information acquired by the information acquisition portion if the service provider information is not acquired by the information acquisition portion.

9. A tone sending-out method in an in-vehicle hands-free phone system that includes a base station, a portable terminal that is wirelessly connected to the base station, and an in-vehicle device that has a storage portion, comprising:

acquiring one of network information about network to which the portable terminal that is currently connected to the in-vehicle device, from the base station via the portable terminal or service provider information about a service provider of the portable terminal that is currently connected to the in-vehicle device;

reading from the storage portion a number sequence whose intermediate portion includes a predetermined code;

determining a tone sending-out behavior about a number sequence part that is subsequent to the predetermined code that is included in the number sequence read from the storage portion, based on one of the network information acquired about the portable terminal or the service provider information acquired about the portable terminal; and sending the read number sequence to the portable terminal and causing the portable terminal to send out the number sequence in a tone based on the tone sending-out behavior determined.

10. An in-vehicle hands-free phone system comprising:

a base station;

a portable terminal that is wirelessly connected to the base station; and an in-vehicle device including:

an information acquisition portion that acquires information about the portable terminal that is connected to the in-vehicle device, the information acquisition portion includes a service provider information acquisition portion that acquires service provider information about a service provider of the portable terminal that is currently connected to the in-vehicle device, and a network information acquisition portion that acquires network information and roaming information about a network to which the portable terminal is currently connected;

a storage portion that stores a number sequence whose intermediate portion includes a predetermined code; and a tone sending-out control portion that sends the number sequence stored in the storage portion to the portable terminal and causes the portable terminal to send out the number sequence in a tone, wherein the tone sending-out control portion determines a tone sending-out behavior about a number sequence part that is subsequent to the predetermined code, based on the service provider information acquired by the service provider information acquisition portion if the service provider information is acquired by the service provider information acquisition portion, and determines the tone sending-out behavior about the number sequence part that is subsequent to the predetermined code, based on the network information and the roaming information acquired by the network information acquisition portion if the service provider information is not acquired by the service provider information acquisition portion.

* * * * *